F. G. ALBORN.
CLUTCH.
APPLICATION FILED MAR. 12, 1918.

1,368,596.

Patented Feb. 15, 1921.
4 SHEETS—SHEET 1.

Inventor:
Frans G. Alborn,
by Emery, Booth, Janney & Varney
Attys

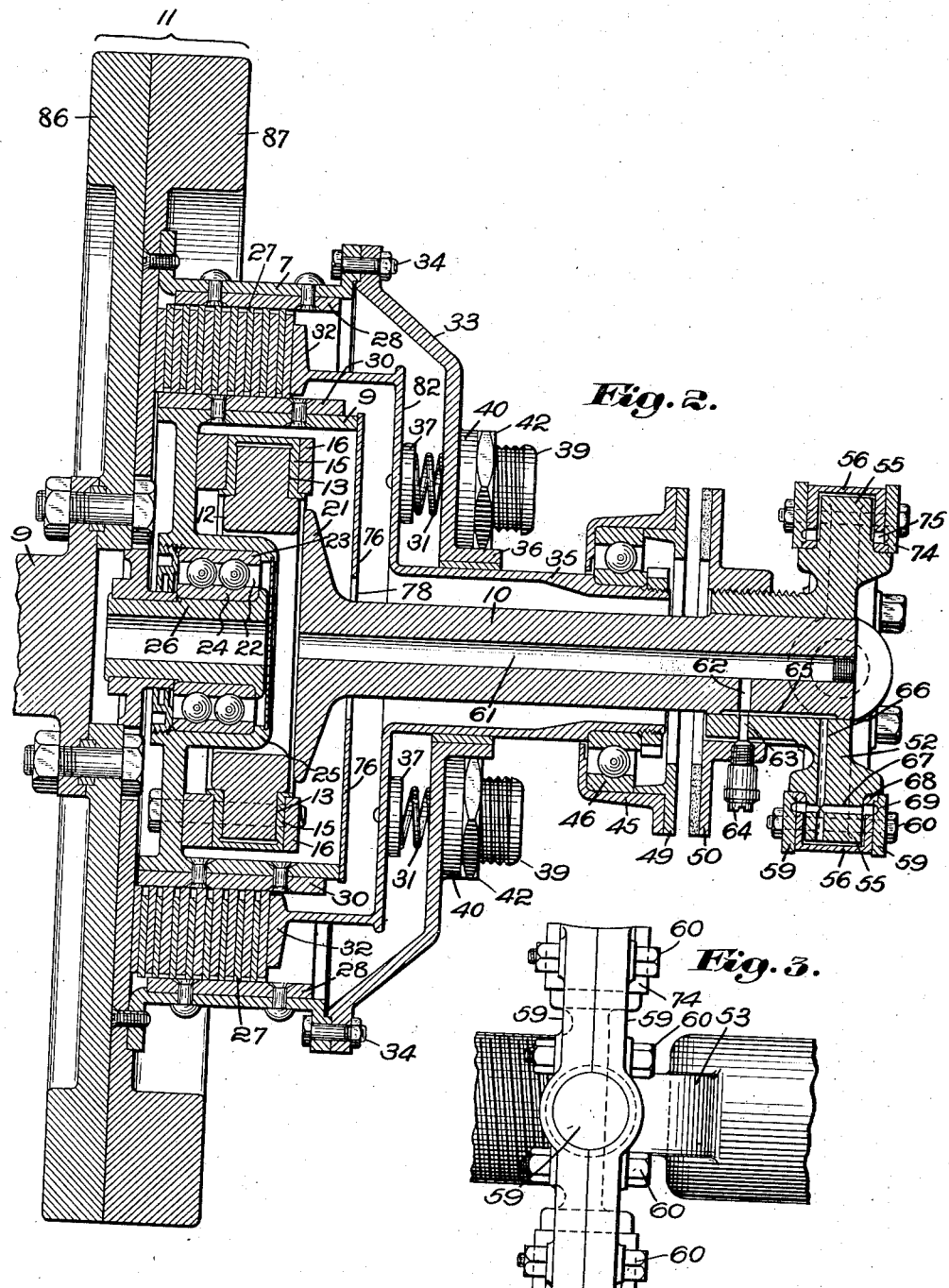

F. G. ALBORN.
CLUTCH.
APPLICATION FILED MAR. 12, 1918.

1,368,596.

Patented Feb. 15, 1921.
4 SHEETS—SHEET 3.

Inventor:
Frans G. Alborn.
by Emry Booth Janney & Varney
Attys

F. G. ALBORN.
CLUTCH.
APPLICATION FILED MAR. 12, 1918.

1,368,596.

Patented Feb. 15, 1921.
4 SHEETS—SHEET 4.

Inventor:
Frans G. Alborn.
by Emery, Booth, Janney & Varney
Attys

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

CLUTCH.

1,368,596.    Specification of Letters Patent.    Patented Feb. 15, 1921.

Application filed March 12, 1918. Serial No. 221,940.

*To all whom it may concern:*

Be it known that I, FRANS G. ALBORN, a citizen of the United States, and a resident of Milford, in the county of New Haven and State of Connecticut, have invented an Improvement in Clutches, of which the following description, in connection with the accompanying drawings, is a specification, like characters on the drawings representing like parts.

This invention relates to clutches, and is more especially concerned with a clutch of the class employed in motor vehicles for the transmission of power from the motor to a shaft which may be the driving shaft of the transmission gear set, or the longitudinal propeller shaft of the vehicle.

My invention will be best understood by reference to the following description, when taken in connection with the accompanying drawings of one specific embodiment thereof, while its scope will be more particularly pointed out in the appended claims.

In the drawings:

Fig. 2 is a horizontal sectional view of the same;

Fig. 3 is a plan of the universal joint which connects the clutch shaft with the longitudinal driving shaft;

Figure 1:
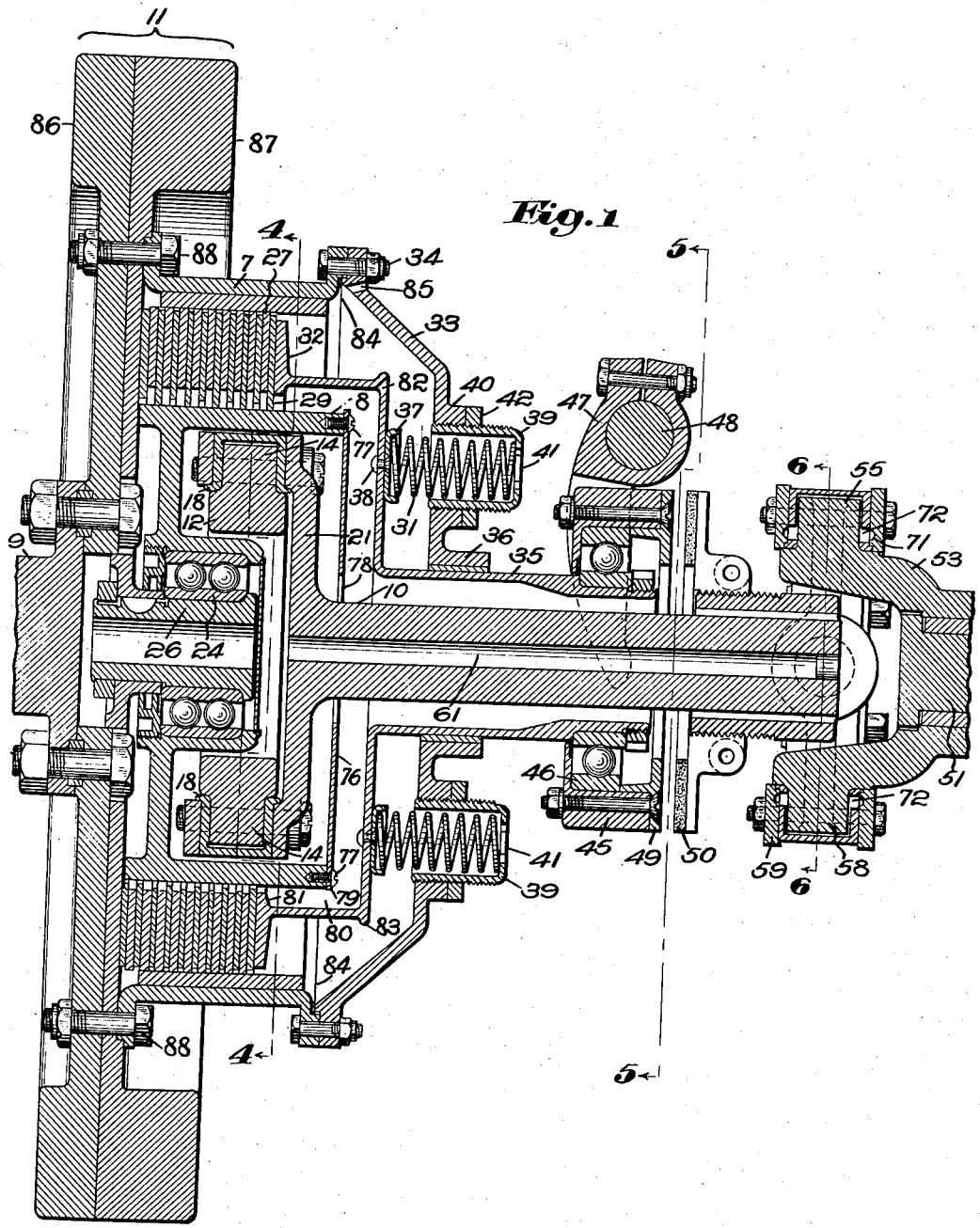
Figure 1 is a vertical, longitudinal, sectional view of a clutch embodying my invention.
Figure 4:
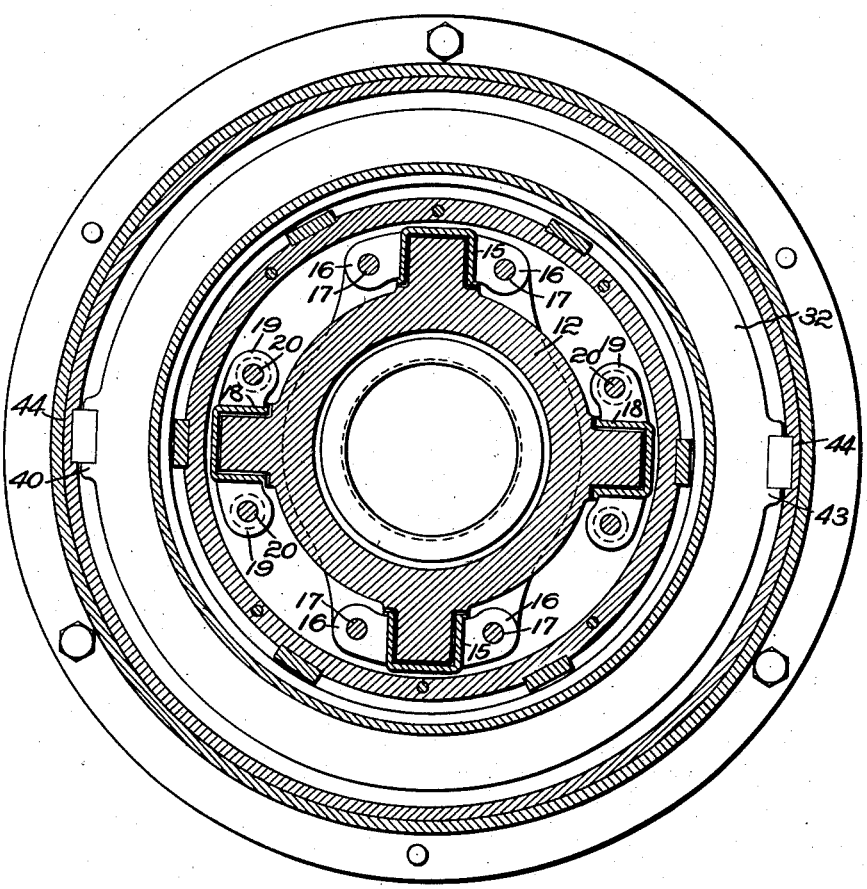
Fig. 4 is a sectional view on line 4—4 of Fig. 1.
Figure 5:
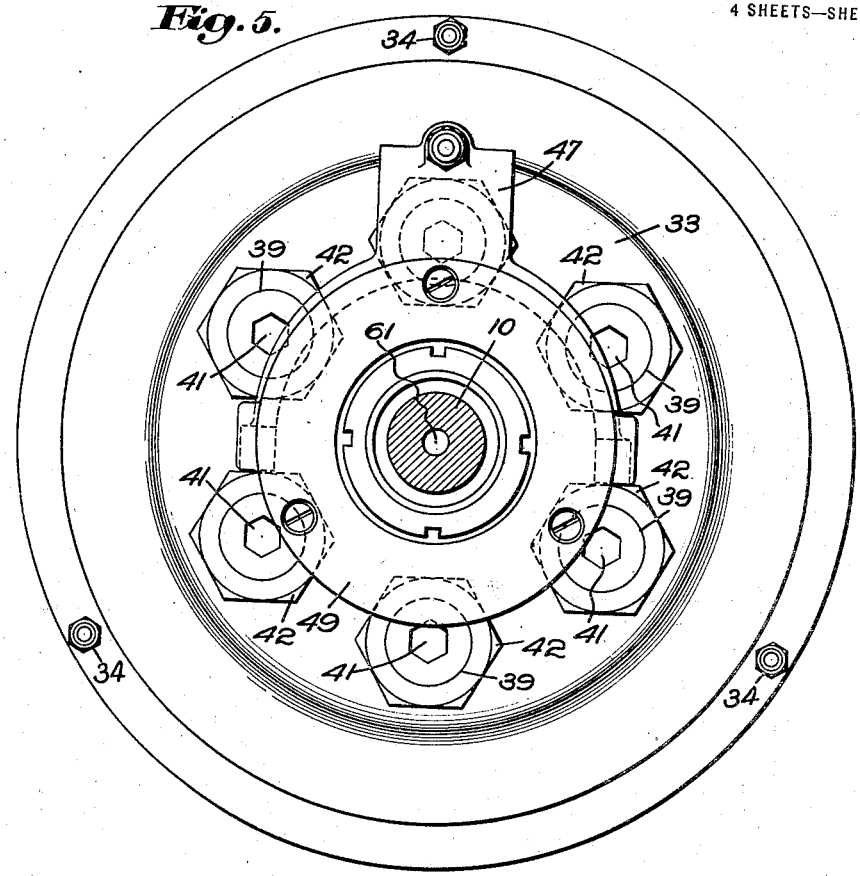
Fig. 5 is a sectional view on line 5—5 of Fig. 1.

Referring to the drawings, and to the embodiment of my invention which is illustrated therein, I have shown a friction clutch of a type commonly known as a multiple disk clutch, having two coöperating rotary clutch members 7 and 8, one in constant driving connection with a driving shaft 9, which may be the crank shaft of the motor, and the other in constant connection with a driven shaft 10. The member 7 is herein connected to the driving shaft 9 by a flywheel 11, and the member 8 is connected to the driven shaft 10 by a universal joint, comprising a ring 12, provided with a pair of axially alined pivots 13, suitably connected with the driven clutch member 8, and a pair of similar axially alined pivots 14, suitably connected with the shaft 10. In the present instance, the pivots 13 are mounted in bushings 15, and the latter are mounted in two-part bearing brackets 16, whose parts are secured to each other and to the driven clutch member 8 by bolts 17, best shown in Fig. 4. Similarly, the pivots 14 are mounted in bushings 18, and the latter are mounted in two-part bearing brackets 19, whose parts are secured to each other and to the shaft 10 by bolts 20, best shown in Fig. 1, said shaft for this purpose being provided with a yoke 21.

The described universal joint may be otherwise suitably located, but I prefer to have the same encircle a bearing 22 which supports the clutch on the fly-wheel. In the present example, this bearing is a common form of double-row, annular ball-bearing, having two ballraces 23 and 24, one mounted within and secured to a hub 25 of the driven clutch member 8, and the other being carried by a short shaft 26, which is secured to the fly-wheel 11, and constitutes in effect a rearward prolongation of the driving shaft 9. This location of the universal joint is advantageous for several reasons, among them being the fact that the mechanism is thereby considerably shortened, and the universal joint can be lubricated without danger of the lubricating oil reaching the clutch surfaces.

While my invention might equally well be employed in connection with cone clutches, I have herein shown the same embodied in a clutch of the multiple disk type, in which the driving member 7 carries a set of driving disks 27 non-rotatably connected therewith by a plurality of keys 28, while the driven member 8 carries a set of similar driven disks 29, connected therewith by a plurality of keys 30. The pressure necessary to cause driving engagement of the two sets of disks 27 and 29 is preferably furnished by a plurality of springs 31, suitably interposed between a part of the driving clutch member 7 and an axially movable plate 32.

In the present example, the driving clutch member 7 is provided with a cover-plate 33, secured thereto by a set of bolts 34, while the axially movable pressure plate 32 is provided with a hub 35, which is mounted to slide axially in a bearing 36 in the cover-plate 33. Any suitable means may be provided to serve as seats for the springs 31, but in the present example, one set of ends is seated in shallow, cup-like seats 37, secured to the plate 32, as by means of rivets 38, while the other set of ends is seated in deep, cup-like seats 39, the latter being threaded into bosses 40 on the cover-plate 33. As a means to provide for adjustment of the tension of the springs 31, the seats 39 are herein provided with polygonal apertures 41, to receive a suitable wrench, whereby the seat may be turned to adjust the same axially. Check-nuts 42 may be provided to secure the spring-seats 39 in the desired position of adjustment. It should here be observed that by the described arrangement of the springs, I am enabled to secure the requisite pressure to produce the necessary friction between the driving and driven members, while at the same time providing a structure which is very compact in an axial direction.

As a means to insure rotation of the pressure-plate 32 and the cover-plate 33 in unison, and to prevent displacement of the springs 31, I have herein provided suitable interengaging means between the plate 32 and the driving clutch member 7, such means herein comprising lugs 43 formed on the plate 32 and provided with key-ways 44 to receive the keys, or some of the keys, 28, carried by the driving member 7. This arrangement is another contributing factor in the shortening of the clutch, since it nonrotatably connects the parts 32 and 33 without adding to the length.

In all clutches of this general class, there is provided clutch-releasing means, including an axially movable thrust collar, against which pressure is exerted in opposition to the spring or springs to cause disengagement of the driving connection between the clutch members. In the present example, I have shown a thrust collar 45, within which is mounted a ball-bearing 46, which receives the radial load, as well as the end thrust of the springs, when the clutch is released. The release is effected by a usual releasing fork 47, carried by a rockshaft 48. When this occurs, a plate 49, carried by the thrust collar brings up against a clutch brake 50, which is suitably secured to the driven shaft 10, so that the latter is brought to rest by reason of the frictional engagement of the rotating brake 50 with the non-rotating plate 49.

Figure 6:
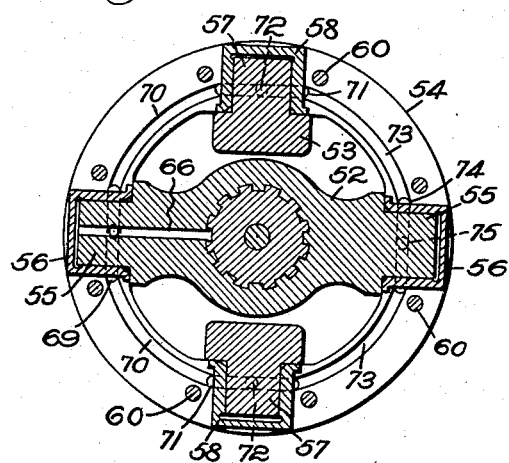
Fig. 6 is a sectional view on line 6—6 of Fig. 1.

In clutches of this class, it is common to make the driven shaft 10 as a short shaft intermediate the driving shaft 9 and another shaft 51, which may be the main driving shaft of a transmission gear set. In such cases, it is usual to employ some form of universal joint between the intermediate shaft and the transmission shaft. In the present example, I have shown a universal joint comprising a yoke 52 carried by the intermediate shaft 10, and a yoke 53 carried by the transmission shaft 51, and connected to each other by a ring 54, to which said yokes are pivoted at right angles to each other, as best shown in Fig. 6. To this end, the yoke 52 is provided with a pair of pivots 55, mounted to turn in bushings 56, the latter being mounted in the ring 54, while the yoke 53 is similarly provided with pivots 57, mounted in bushings 58, the latter being mounted in said ring. Preferably, the ring 54 is formed in two parts 59, secured to each other by a set of bolts 60. The yoke 52 may be, and herein is, splined on the intermediate shaft 10, so as to permit a certain amount of relative axial movement between the shafts 10 and 51.

I have herein provided a common means for supplying lubricating oil through the intermediate shaft 10 to both the universal joints, such means being entirely self-contained and capable of being filled with a sufficient amount of oil to last for a considerable length of time. To this end, I have herein provided the intermediate shaft 10 with an oil duct 61, which conducts oil toward both universal joints, and which itself is supplied with oil through a lateral duct 62, which in turn communicates with a duct 63 in the hub of the yoke 52. In the present example, this hub is threaded into the hub of the clutch brake 50 and the latter carries a suitable filling device, herein in the form of an oil cup 64, through which the oiling system may be filled. As a means to insure constant communication between the ducts 62 and 63, in spite of relative axial movement of the shaft 10 and yoke 52, said shaft is herein provided with a longitudinal groove 65, which is of sufficient length to maintain such communication at all times.

The groove 65 may also constitute a part of a system of ducts to conduct oil to the bearing surfaces of the universal joint which connects the shafts 10 and 51. To this end, the yoke 52 is herein provided with a radial duct 66, communicating at all times with the groove 65, and delivering oil to the bearing surfaces of the pivots 55 and their bushings 56. Branch ducts 67, leading from the radial ducts 66, communicate through openings 68 in the bushings 56 with circumferential ducts 69 encircling the bushings 56, and they, in turn, communicate with segmental ducts 70, best shown in Fig. 6. Preferably, the ducts 69 and 70 are formed partly in each of the two parts of the ring 54, which, it will be remembered, is split and secured together by bolts 60.

The segmental ducts 70 conduct the oil from the circumferential ducts 69 to other similar circumferential ducts 71 surrounding the bushings 58, and the latter are provided with openings 72, which, in turn, communicate with the interiors of the bushings, and thus supply oil to the bearing surfaces of the pivots 57. The remaining pivot 55 is supplied with oil in a similar manner by providing segmental ducts 73, communicating with the circumferential ducts 71, and in turn, communicating with a circumferential duct 74, encircling the remaining bushing 56, as best shown in Fig. 6. This bushing is likewise provided with openings 75, to conduct the oil from the circumferential duct 74 to the bearing surfaces of the remaining pivot 55, as best shown in Fig. 2. The bushings 56 and 58 may be interiorly grooved, and they may be chambered to a sufficient depth to provide clearances at the ends of their respective pivots, so that the bearing surfaces of the latter may be assured of ample lubricating oil, as will be evident from an inspection of Figs. 1 and 2.

Turning now to the universal joint, which connects the other end of the shaft 10 with the driven clutch member 8, I have provided for this universal joint an oil reservoir formed within said clutch member, and having an annular channel shape. The outer wall of the reservoir is herein formed by a plate 76, secured to the clutch member 8 by screws 77. This plate is provided with a central opening 78 of sufficient size to allow free play of the shaft 10. Thus there is provided an oil reservoir which receives oil from the duct 61, and provides for an oil bath, in which all the working parts of the universal joint operate.

If, by any chance, any oil should escape from the oil reservoir, I have provided means for utilizing centrifugal force to keep such oil away from the friction surfaces of the friction disks 27 and 29. To this end, I have herein provided the plate 76 with an annular flange 79, which will act as a collector, and will serve to throw off any escaping oil. The oil thus thrown off may be received by an annular trough 80 in the pressure plate 32, such trough being formed with a ledge 81, serving as a means to prevent the oil from working along toward the friction disks. As a means for conducting the oil from the annular trough 80, the latter may be provided with one or more, herein a plurality of openings 82, leading to the exterior thereof. The oil escaping through these openings may be prevented from working toward the friction surfaces by providing the exterior of the trough 80 with an annular flange 83, for utilizing centrifugal force to cause the oil to gather at this point, and to be thrown off into the interior of the driving clutch member 7. The latter, in turn, may be provided with an annular trough 84, to receive the oil thus thrown out, and finally the oil may be permitted to escape through one or more openings 85, provided in the cover-plate 33. Thus it is evident that if, by any possibility, any oil should escape from the reservoir, the same will be carried away by centrifugal force, without danger of its reaching the frictional surfaces of the clutch. This is of great importance where the clutch is of what is known as the dry disk type.

In clutches of this class, it is often found difficult to remove the clutch from the motor car, because the forward end of the clutch is partially housed within a recess provided in the fly-wheel. Under such circumstances, it has heretofore been found necessary to unfasten the clutch from the fly-wheel, and then to move the clutch in a rearward direction, until it is clear of the fly-wheel, before it is possible to remove the clutch from the car. In the present embodiment of my invention, I have, to a very large extent, reduced the difficulty of removing the clutch by employing a two-part fly-wheel 11, consisting of front and rear portions 86 and 87, secured to each other by bolts 88, which if desired may also serve to secure the portion 87 to the driving member 7 of the clutch. It should now be evident that, by removing these bolts, the section 87 may be detached from section 86, and removed with the clutch. This being so, it is clear that the clutch and rear section of the fly-wheel require to be moved only a small distance in a rearward direction, before being taken out of their place in the car.

While I have herein shown and described one form or embodiment of my invention, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one form of my invention, what I claim and desire by Letters Patent to secure is:

1. In a clutch, the combination of driving and driven shafts, driving and driven clutch members, a bearing for connecting said driving shaft and driven member within said driven member and supporting the latter, and a universal joint supported by and connecting said driven member to said driven shaft, said universal joint comprising a ring encircling said bearing and pivoted to said driven member and to said shaft.

2. In a clutch, the combination of driving and driven shafts, driving and driven clutch members, a bearing for connecting said driving shaft and driven member within said driven member and supporting the latter, and a universal joint supported by and connecting said driven member to said driven shaft, said universal joint comprising a ring encircling said bearing and provided with two pairs of pivots, and two pairs of bearings for said pairs of pivots, respectively, one pair of bearings being carried by said driven member and the other by said driven shaft, the latter being supported by said driven member.

3. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, and an annular flange carried by said driven member for utilizing centrifugal force to compel any escaping oil to seek said flange and to be thrown off its periphery.

4. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, an annular flange carried by said driven member for utilizing centrifugal force to compel any escaping oil to seek said flange and to be thrown off its periphery, and means to carry away the oil thrown off by said flange.

5. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, an annular flange carried by said driven member for utilizing centrifugal force to compel any escaping oil to seek said flange and to be thrown off its periphery, and an annular trough to receive the oil thrown off by said flange.

6. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, an annular flange carried by said driven member for utilizing centrifugal force to compel any escaping oil to seek said flange and to be thrown off its periphery, and an annular trough to receive the oil thrown off by said flange, said trough being provided with means for utilizing centrifugal force to carry the oil away from said trough.

7. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, an annular flange carried by said driven member for utilizing centrifugal force to compel any escaping oil to seek said flange and to be thrown off its periphery, and an annular trough to receive the oil thrown off by said flange, said trough being provided with means to conduct the oil from the interior to the exterior thereof, and an annular flange for utilizing centrifugal force to throw off the oil escaping from said trough.

8. In a clutch, the combination of driving and driven shafts, driving and driven clutch members, a bearing for supporting said driving shaft and driving member within said driven member, a universal joint connecting said driven member to said driven shaft, said driven member being provided with an oil reservoir inclosing said universal joint, an annular flange carried by said driven member for utilizing centrifugal force to compel any escaping oil to seek said flange and to be thrown off its periphery, and an annular through to receive the oil thrown off by said flange, said trough being provided with means for utilizing centrifugal force to carry the oil away from said trough, and said driven member having means for utilizing centrifugal force to carry away the oil received from said trough.

In testimony whereof I have signed my name to this specification.

FRANS G. ALBORN.